April 18, 1967 R. F. ALLGOOD 3,314,167

COLOR ANALYZING APPARATUS

Filed Aug. 3, 1964

INVENTOR.
ROBERT F. ALLGOOD

BY

Townsend and Townsend

ATTORNEYS 3,314,167

COLOR ANALYZING APPARATUS

Robert F. Allgood, 490 S. Springer Road, Los Altos, Calif. 94022

Filed Aug. 3, 1964, Ser. No. 386,942
2 Claims. (Cl. 35—28.3)

This invention relates to a device for analyzing a color by matching the color with a composite color area on the device, which composite color area is formed by admixture of two or more primary colors. The apparatus is particularly useful in analyzing color art work that is to be printed by a lithographic process.

In producing a multi-color lithographic print, two or more printing plates are prepared and are used sequentially in producing the final print. Each plate is coated with in of a particular color (typically a primary color), and the color of the final print depends upon the saturation or tone of coloring present in the individual plates. The accuracy with which composite colors are duplicated depends to a substantial degree on the proper selection of the tones of each constituent color that make up the final composite color on the finish print.

Accordingly, it is an object of the present invention to provide a device for presenting a plurality of composite color areas that are constituted by mixtures of two or more primary colors. The tone of each primary color is indicated to the user of the device so that the lithographic plates can be made up accordingly. The tone of each constituent primary color is adjustable with respect to the other primary colors so that a wide variety of groups of composite colors can be viewed sequentially until the proper composite tone and hue is obtained.

The embodiment of the present invention to be described in detail hereinafter includes two or more transparent discs, each having a plurality of areas of a primary color in different shades of the color. The particular color of all areas in each individual disc is different from the color of the areas in the other discs. The color areas are formed on each disc in a congruent pattern so that when one or more disc is superimposed upon another, a plurality or group of composite color areas is displayed, each such composite color area being made up of different combinations of shades of the primary colors. Associated with each primary color area is a numerical indicium which indicates the shade or degree of the particular area. In the present invention, provisions are made for viewing such indicia simultaneously so that one is readily apprised of the individual constituents making up a given composite color. Because each disc is movable with respect to the remaining discs, the hue of the composite color areas can be adjusted by adjusting the shade of the various primary constituents thereof.

A widely used prior art technique for rendering a piece of colored art work into two or more lithographic plates is the provision of a book containing many pages on which were printed various combinations of the plural primary colors. In using such prior art device, it is necessary to peruse many pages of color areas until a proper match is discovered. An advantage of the present invention is that various colors are obtained simply by moving one or more of the discs with respect to the others so as to vary the hue of composite color areas displayed.

Another advantage of the present invention is that a plurality of color areas are created simultaneously so that if one fails to secure an exact match at one relative setting of the discs one is provided with an indication as to what adjustments in the relative position of the discs are necessary to accomplish precise matching.

In one preferred form of the invention color areas on the discs are formed in abutting relation to the periphery of the device, thereby permitting the device to be laid directly on the art work for precise color matching.

A further feature and advanatage of the present invention is that each disc is formed of extremely thin transparent material so that the individual color areas are in close proximity to one another in forming the composite color area. Thus the fidelity of the composite color areas is increased, since in the final lithographic print, the composite colors are printed one on top of the other in intimate contact.

A still further feature and advantage of the present invention is that the areas of an individual color are formed on the discs by a plurality of dots, the tone or saturation of the particular color area being a function of the density of the dots in the area. The dots are arranged in each area in mutually perpendicular rows and columns, and the angle that the columns make with respect to a radial line from the center of the disc to a particular area is established identical with a similar angle on the lithographic plate as finally produced. This feature and advantage contributes to the accuracy obtainable with the present invention.

Other objects, features and advantages will be more apparent upon referring to the following specification and accompanying drawing in which.

Figure 4:
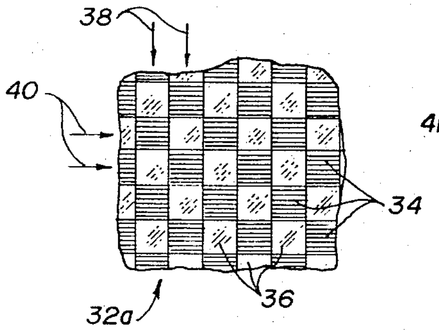
FIG. 4 is an enlarged view of a portion of one of the color areas of the disc of FIG. 3.

Referring more particularly to the drawings, reference numeral 12 indicates a base of rigid planar material having generally circular form and including a handle 14 extending therefrom. Base 12 has a white upper surface 16. Concentrically with the central geometric axis of base 12 is a stub shaft 18 which projects normal to surface 16.

A plurality of transparent discs 20, 22, 24 and 26 are provided. All the discs have the same diameter, which is somewhat less than that of base 12, and are each formed with an aperture 28 centrally thereof for running fit on stub shaft 18. A reinforcing member 30 is preferably secured to the disc in circumscribing relation to aperture 28. Each of the discs 20, 22, 24 and 26 are formed of transparent material. An examplary material that has been found satisfactory is an emulsion coated polyester material sold under the trademark "Positive Color Key" by the Minnesota Mining and Manufacturing Company. Such material has a thickness of approximately .002 inch and is available with various emulsions thereon for producing various colors. The transparent discs are preferably relatively thin so that color areas formed on the discs will, when the discs are in overlying contacting relation, be spaced sufficiently near one another to avoid distortion.

In a preferred form of the present invention, disc 20 is formed with a plurality of yellow areas thereon, disc 22 is formed with a plurality of red or magenta areas thereon, disc 24 is formed with a plurality of blue or cyan areas thereon, and disc 26 is formed with a plurality of black areas thereon.

Figures 1, 3, 5:
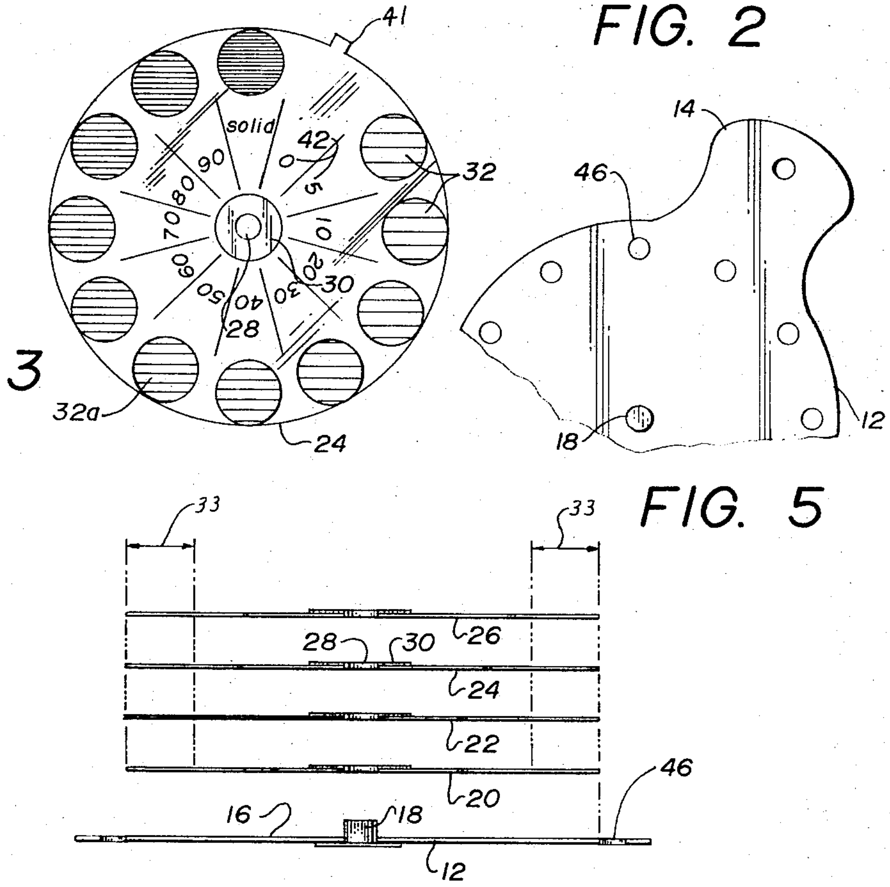
FIG. 1 is an exploded side view of the parts of a satisfactory embodiment of the present invention.
FIG. 3 is a plan view to reduced scale of one disc of the present invention.
FIG. 5 is a partial plan view of a base according to the present invention.

Referring to FIG. 3, disc 24 is shown in some detail and is typical of the other discs used in practicing the present invention. Disc 24 is divided into 12 equal sectors, in 11 of which are provided color areas 32. As seen at 33, FIG. 1, all color areas are the same size and lie contiguous to the periphery of the disc. The twelfth sector is blank or transparent. A portion of section 32*a* is shown in enlarged form in FIG. 4 and includes a plurality of dots 34 between which exists transparent portions 36. Dots 32 are arranged in a plurality of mutually perpendicular columns 38 and rows 40. It will be noted that the dots 34 in FIG. 4 are equal in size to transparent portions 36. For that reason 50% of the area 32*a* is occupied by dots 34. The remaining areas 32 on disc 24 include areas wherein 5% of the area is covered by dots, 10% of the areas is covered by dots, and so on, up to 100%. The ink or dye used to form dots 34 is transparent. The disc is provided with a tab 41 for facilitating rotary positioning of the disc.

It is conventional practice in the preparation of lithographic plates to form the columns 38 and the rows 40 of respective dots at an angle with respect to a vertical axis in the final work which angle differs for each color. An example of a particular type of such angular orientation is explained in McGraw-Hill Encyclopedia of Science and Technology (1960), at volume 10, page 606–607. In the present invention such angular orientation is provided in the discs by making all areas on a given disc at a constant angular orientation with respect to the line extending from the particular area to the center of the disc. A typical orientation there described is black, 45°; red or magenta, 75°; yellow, 90°; and blue or cyan, 105°. Such angle refers to the angle that the row 40 of dots makes with a line extending from the center of the disc to the particular area.

Figure 2:
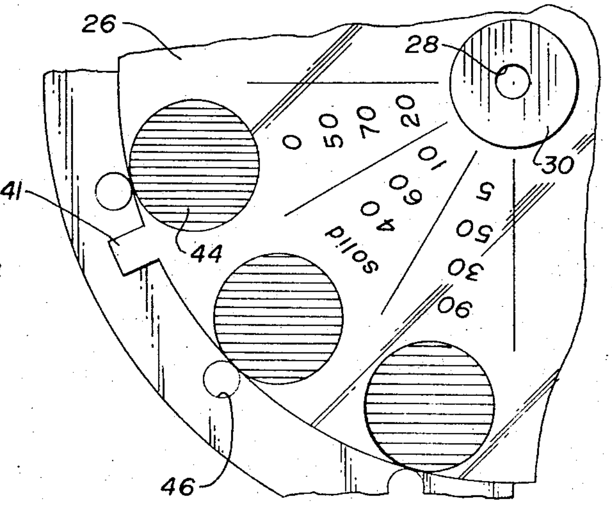
FIG. 2 is a partial top view of the device of FIG. 1 in assembled condition.

Associated with each color area 32 is a numerical indicium 42 which indicates the percentage of the associated area that is occupied by dots 34. Consequently the indicia 42 give an indication of the degree or shade of the particular color. As seen most clearly in FIG. 2, the indicia for each disc are spaced different amounts from the center so that each constituent of a given composite color area can be readily discerned by the user of the device. For example, the composite color area designated at 44 is constituted by zero yellow, a 50% color area of magenta, a 70% color area of cyan, and a 20% color area of black.

Base 12 is formed with twelve uniformly spaced holes 46 therethrough, which are so spaced from shaft 18 that composite color areas 44 are tangent with the edge of the holes. Thus when the device is placed on a piece of art work with the color to be matched appearing in a hole 46, all interfering colors are masked by the base.

The operation of the above described embodiment of the invention is as follows: When it is desired to determine the constituent primary colors necessary to match a particular portion of a piece of art work that is to be reproduced by the lithographic process, the base 12 with two or more discs 20, 22, 24 or 26 in place thereon on stub shaft 18 is placed proximate the particular portion with the portion visible through a hole 46. The arrangement of the discs on the base should be in accord with the sequence of passes contemplated during printing. In a four-color process it is typical for the yellow pass to be made first followed by the magenta, cyan, and black in the order listed. Consequently for analyzing a color that is to be reproduced by such exemplary process, the yellow disc is placed next to base 12, and the magneta, cyan, and black discs are placed thereover in the listed order. The discs are then rotated with respect to one another by use of tabs 41 while the composite color areas formed thereby are observed and compared with the art work color visible in hole 46. When a suitable color match is obtained, the constituents thereof are denoted by the indicia in radial alignment with the satisfactory composite color area. It will be noted that a plurality of composite color areas are displaced at any given relative position of the discs. Consequently, the user of the device, if he fails in a given setting to secure a proper color match, is given a suggestion by the variation in shades displayed in the plural composite areas as to which particular disc should be rotated to secure a desired match.

Within the purview of the present invention is the provision of four discs arranged as disc 24 of FIG. 3, which discs are constructed of opaque white paper and on each of which discs is provided color areas identical to the color areas provided on the transparent discs. Spaces 36 on such disc will be white rather than transparent. Such opaque discs are useful in combination with transparent discs, particularly when a two or three color process is being used. Moreover, the individual disc formed on opaque white paper is useful as a color checking device during the printing of a given single color.

The device of the present invention when using four discs each of which has eleven color areas and one plain area is capable of producing a total of 20,735 different combinations. This number is adequate for most lithographic work.

Thus it will be seen that the present invention provides a color anlayzing device that is extremely versatile, rapid in its use, and constructed in accordance with standard lithographic techniques so that the results are useful in preparing lithographic plates. Moreover, the simplicity of construction of the device permits its wide utility at low cost.

Although one embodiment of the invention has been shown and described, it will be apparent that other adaptations and modifications can be made without departing from the true spirit and scope of the invention.

I claim:

1. A color matching device comprising a base, a plurality of discs concentrically mounted on said base for rotation about their respective central axes, each said disc having thereon a plurality of color areas that are equally radially and circumferentially spaced with respect to the central axis and to one another, each said color area being formed by a plurality of uniformly spaced apart dots, said disc being transparent intermediate said dots, the proportion of each said color area that is occupied by dots being different for each area on a given disc, numerical indicia associated with each said area for indicating the percentage of said area covered by said dots, each individual said disc having color areas of a color different from the color of color areas on the other said discs, whereby rotation of said discs relative one another affords different admixtures of colors and the indicia afford an indication of the constituents of a mixed color, said base having a diameter greater than said discs so that an annular margin of said base extends beyond said discs, said margin being provided with at least one hole so radially spaced that edges of said color areas are aligned with said hole.

2. The invention of claim 1 wherein said margin is formed with a plurality of holes which holes are equal in number to said color areas and are uniformly spaced therearound.

References Cited by the Examiner

UNITED STATES PATENTS

| | | | |
|---|---|---|---|
| 624,331 | 5/1899 | Henderson | 35—28.5 |
| 862,336 | 8/1907 | Kallab | 35—28.3 |
| 1,636,991 | 7/1927 | Fueglein | 35—28.3 |
| 2,253,107 | 8/1941 | Brooks | 35—28.5 |
| 3,088,226 | 5/1963 | Watterson et al. | 35—28.3 |
| 3,088,227 | 5/1963 | Tudor | 35—28.5 |

EUGENE R. CAPOZIO, *Primary Examiner.*

H. S. SKOGQUIST, *Assistant Examiner.*